Figure 1:
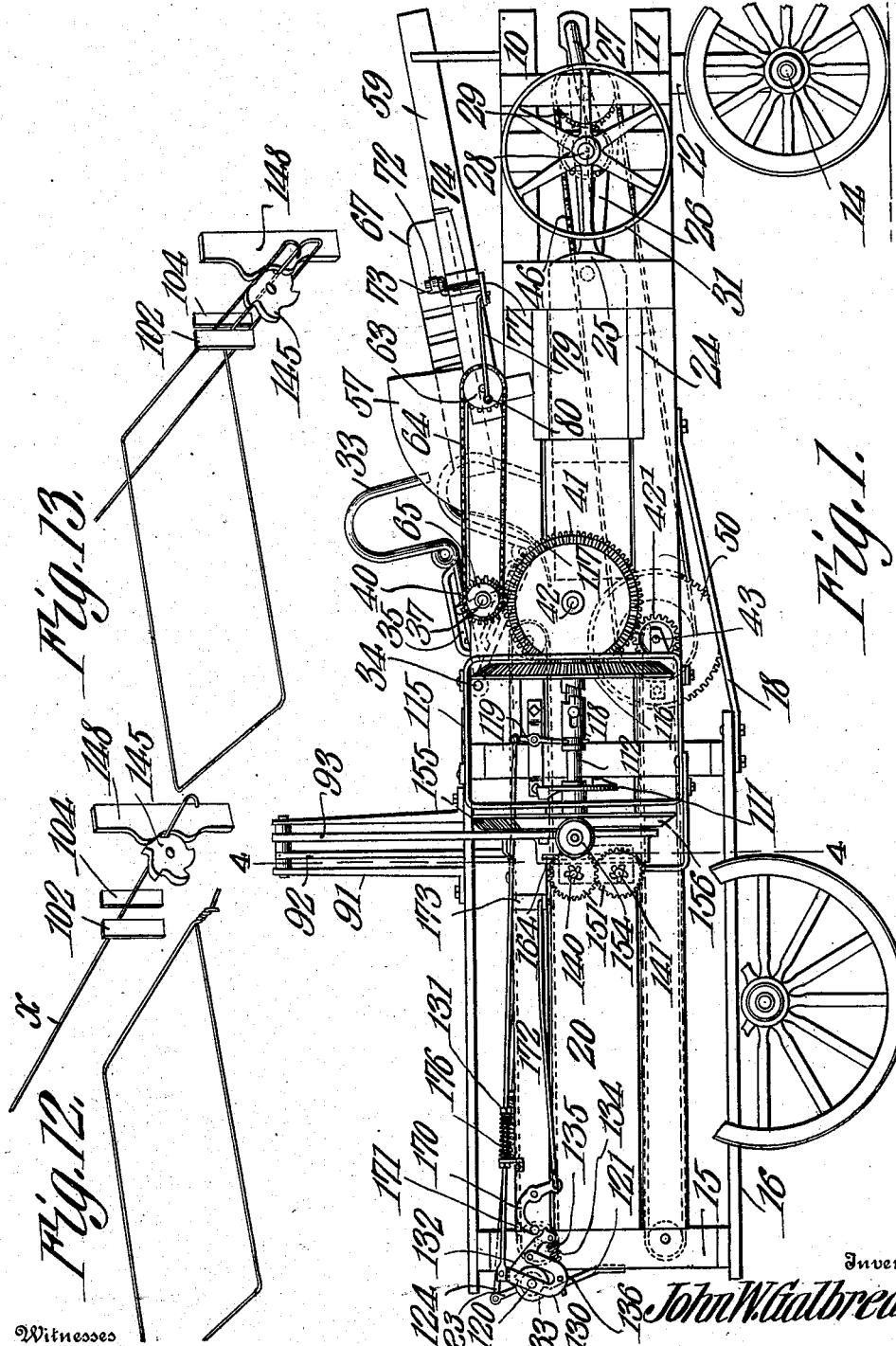

J. W. GALBREATH.
BALING PRESS.
APPLICATION FILED DEC. 21, 1907.

No. 899,663.

Patented Sept. 29, 1908.
6 SHEETS—SHEET 6.

Witnesses

Inventor
John W. Galbreath
By
Attorneys

UNITED STATES PATENT OFFICE.

JOHN W. GALBREATH, OF AUXVASSE, MISSOURI.

BALING-PRESS.

No. 899,663.

Specification of Letters Patent.

Patented Sept. 29, 1908.

Application filed December 21, 1907. Serial No. 407,532.

*To all whom it may concern:*

Be it known that I, JOHN W. GALBREATH, a citizen of the United States, residing at Auxvasse, in the county of Callaway and State of Missouri, have invented a new and useful Baling-Press, of which the following is a specification.

This invention relates to apparatus for baling hay, straw and other material, and has for its principal object to provide a press of very simple and effective construction which may be used in connection with a thresher or similar machine, or which may be employed for baling hay or straw by horse power.

A further object of the invention is to provide improved means for feeding material to the baling chamber, so that the feed will be gradual and uniform in order to produce bales of uniform density and weight.

A still further object of the invention is to improve the construction of the baling chamber by the employment of movable belts which form the upper and lower walls of the chamber, and which carry permanent division strips, so arranged as to aline with each other and separate the bales to an extent sufficient to permit the ready introduction of the binding or baling wires between them.

A still further object of the invention is to improve and simplify the construction of the bale wire twisting mechanism, and to place the same under the control of the bales as the latter are discharged from the machine, the wire manipulating mechanism being held inoperative and wholly beyond the lines of the baling chamber until a bale is formed, and then being set into operation for the purpose of completing the passage of the wires around the bale and the twisting of such wires together.

A still further object of the invention is to provide a mechanism of this class in which the operation of the movable belts of the baling chamber is automatically stopped during the bale tying operation and automatically started as soon as this operation is completed.

A still further object of the invention is to provide a novel form of tying mechanism in which the wires are firmly gripped and held until the twisting operation is completed, the twisted wires being cut and automatically released while the single strands are held in order to form a loop into which the fresh material is forced during the process of compressing a following bale.

A still further object of the invention is to provide an improved means for detaching the hay or other material of one bale from the following bale, the wire carrying needles being provided with cutting knives which operate to divide the hay as the needles cross the chamber for the purpose of placing the wires in engagement with the twisting devices.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 2:
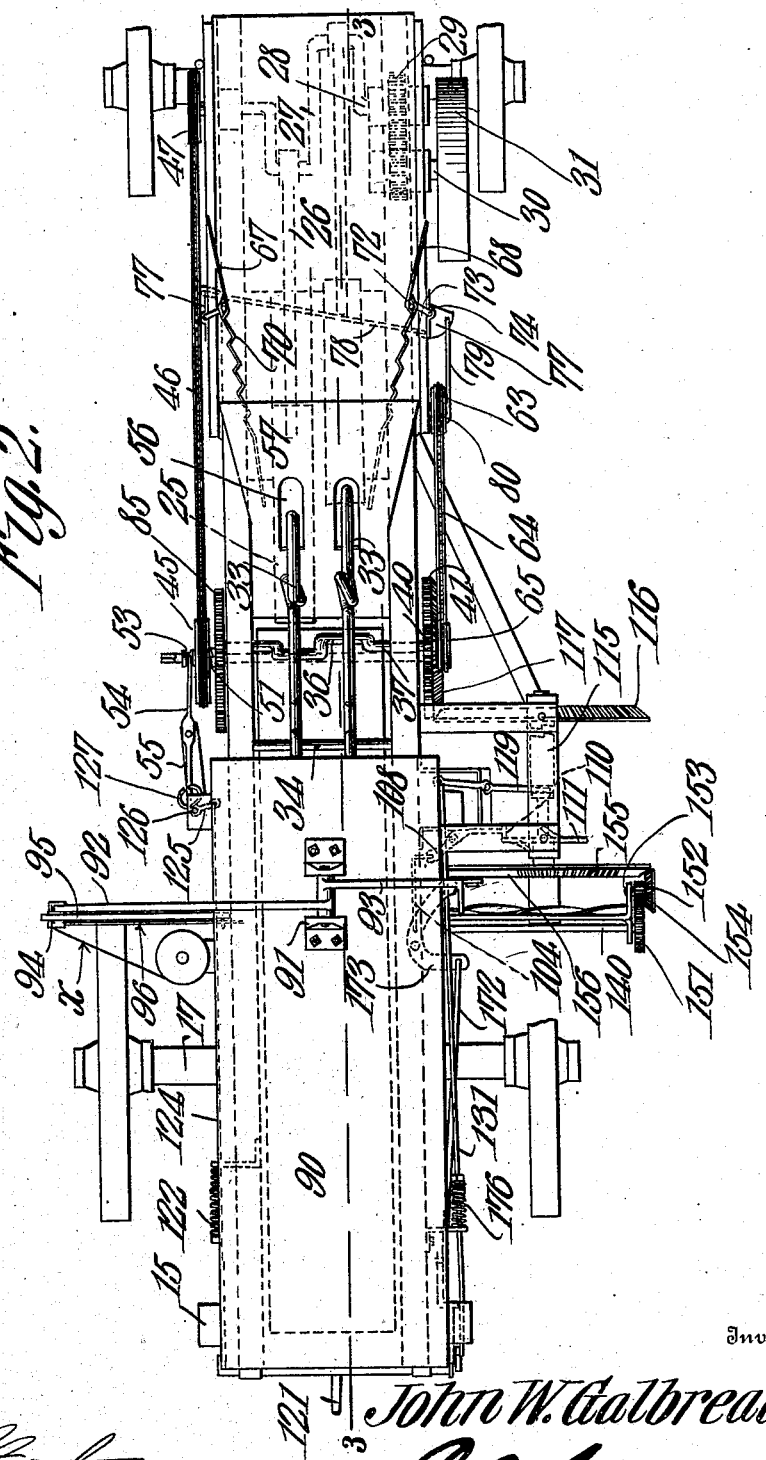
Figure 3:
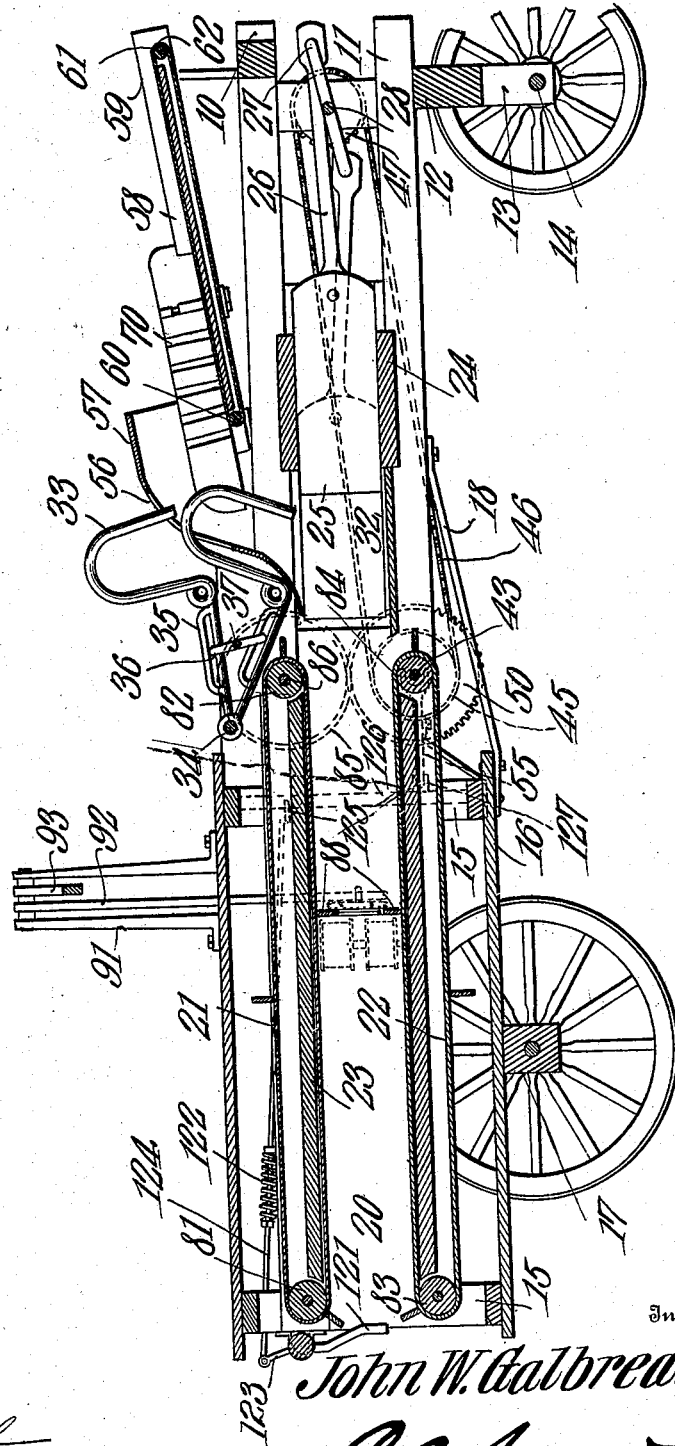
Figure 4:
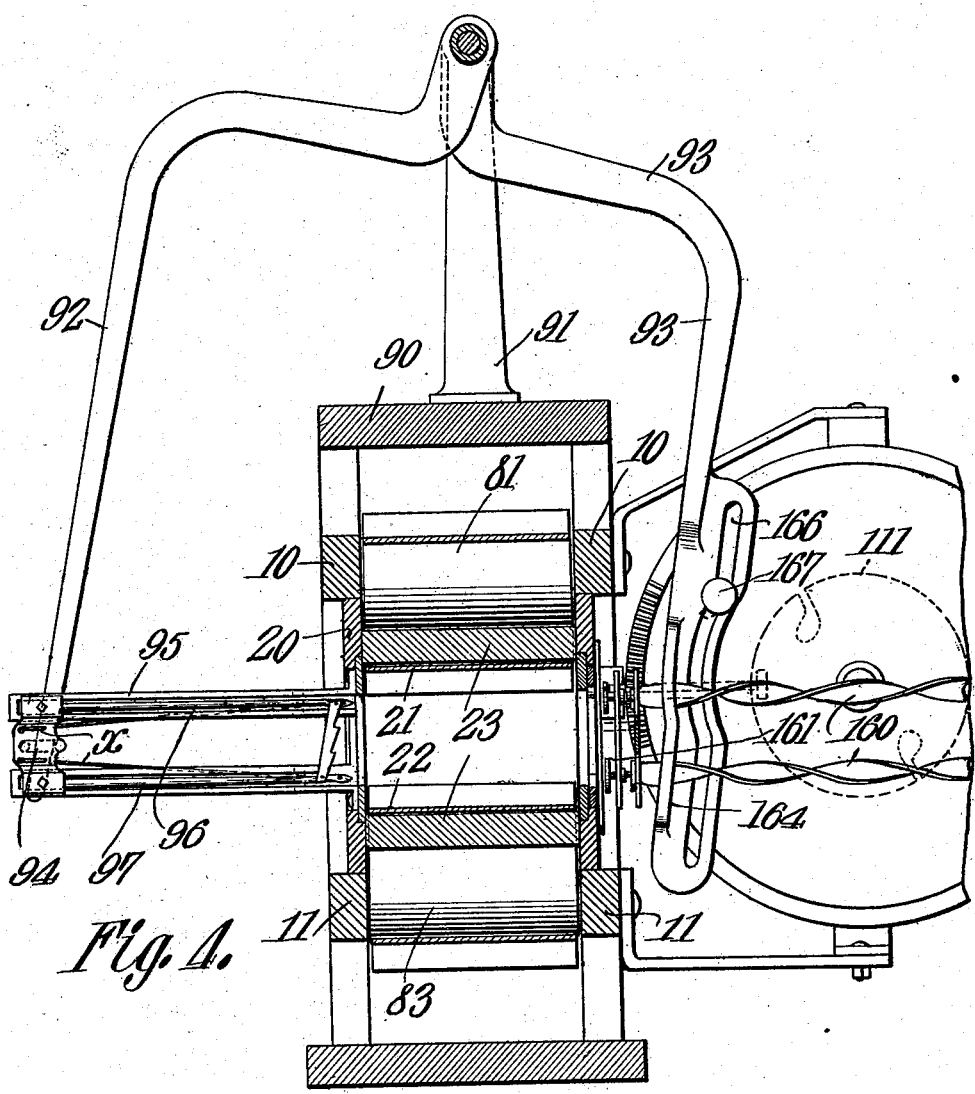
Figure 5:
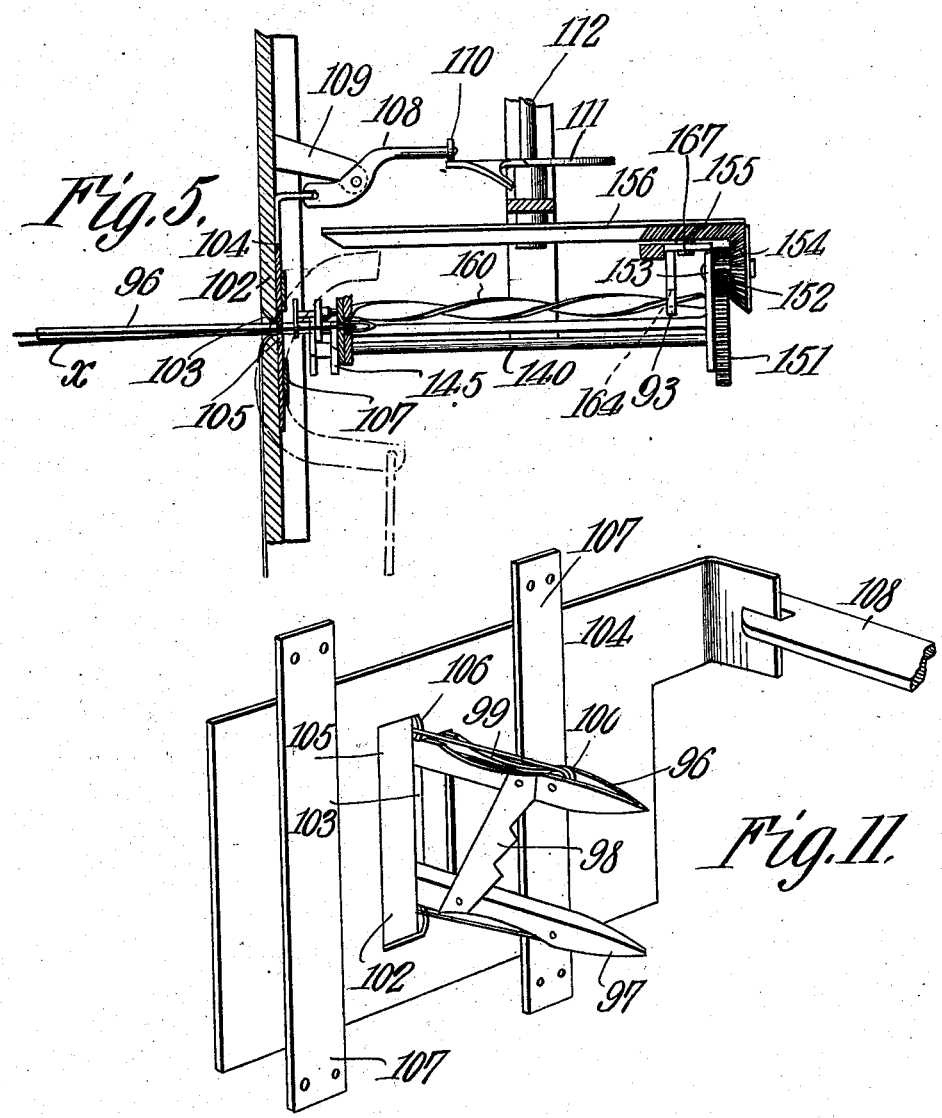
Figure 6:
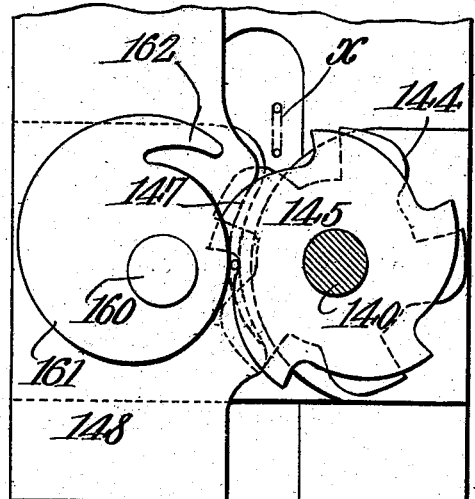
Figure 8:
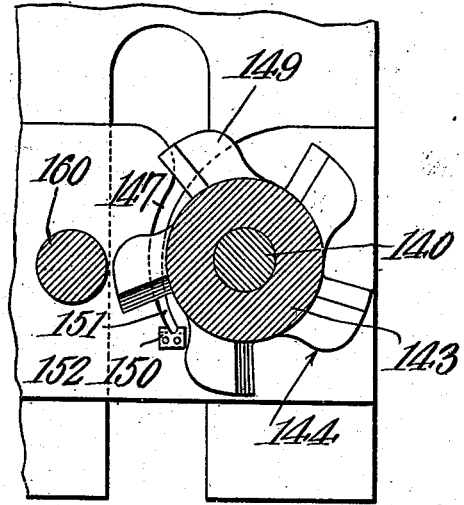
Figure 7:
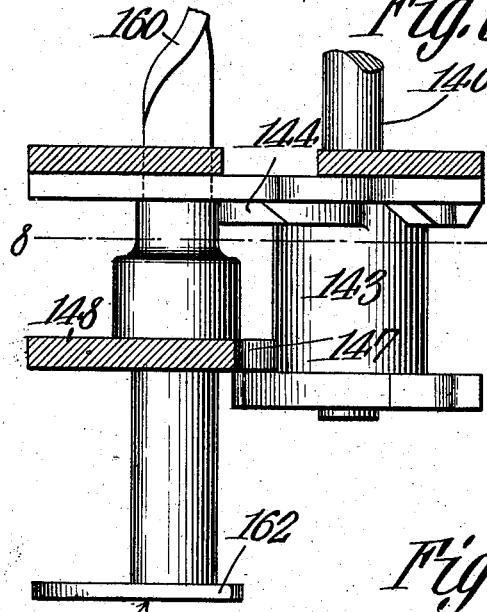
Figure 9:
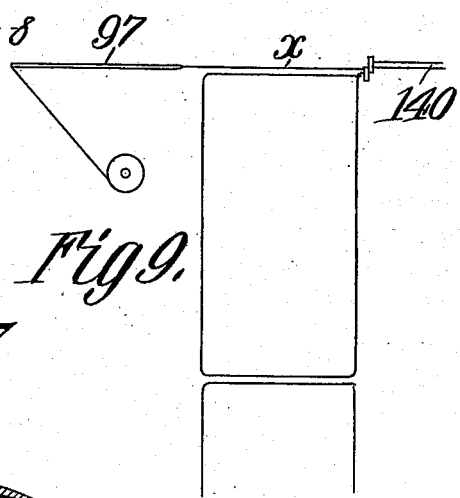
Figure 10:
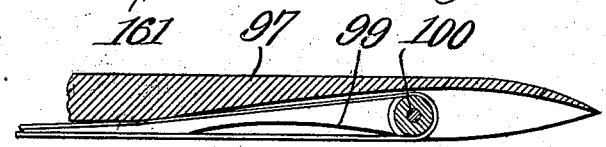

In the accompanying drawings:—Figure 1 is a side elevation of a baling press constructed in accordance with the invention, one of the rear wheels being partly broken away. Fig. 2 is a plan view of the machine. Fig. 3 is a longitudinal sectional view on the line 3—3 of Fig. 2. Fig. 4 is a transverse sectional view of the press on the line 4—4 of Fig. 1. Fig. 5 is a sectional plan view through the wire twisting mechanism. Fig. 6 is a sectional elevation of the revoluble wire clamp and twisting mechanism drawn to an enlarged scale. Fig. 7 is a plan view of the same. Fig. 8 is a transverse section on the line 8—8 of Fig. 7. Fig. 9 is a diagram showing the general course of the baling wire around two adjacent bales. Fig. 10 is a sectional view of the pointed end of the needle drawn to an enlarged scale. Fig. 11 is a detail perspective view of the two needles and the bale cutting knife carried thereby. Fig. 12 is a perspective diagram showing the two wire clamps and the revoluble clamp holding the wire which is to pass around the bale being formed, and, also, illustrating the twisted wire of a completed bale. Fig. 13 is a similar diagram showing the position of the clamps immediately after the passage of the lower needle and before the commencement of the twisting operation.

Similar numerals of reference are employed to indicate corresponding parts throughout the several figures of the drawings.

The main frame of the machines, comprises four heavy beams arranged to form an upper pair 10 and a lower pair 11, all of these beams extending continuously throughout the length of the machine, and being disposed in parallel relation. The forward ends of the lower beams are carried by a bolster 12, that is connected by a king pin to a lower bolster 13 on the front axle 14 for steering purposes. The rear portions of the beams are connected by two pairs of upright beams 15, which rest on a platform 16 that is secured to the rear axle 17, this platform being connected to the lower beams 11 by suitable reinforcing bars 18.

The vertical sides of the baling chamber are formed by plates 20 which are rigidly secured between the beams 10 and 11 and the horizontal walls are formed of upper and lower movable belts 21 and 22, which will be hereinafter referred to, these belts being backed by plates 23, which prevent their bulging outward during the bale compressing operations.

At a point in advance of the entrance to the baling chamber, the beams 10 and 11 carry a rectangular guide 24, in which is mounted a pair of alternately operating plungers 25, the rear ends of these plungers being connected by rods 26 to a pair of cranks 27 carried by a main shaft 28 that is journaled in bearings at the front end of the machine. This shaft 28 is connected by gears 29 to a shaft 30 carrying a belt wheel 31, that may be driven from the threshing machine, traction engine or other source of power.

The plungers 25 operate alternately and force any material which may drop on the flooring 32 into the entrance end of the baling chamber. The hay or other material is fed downward to a position to be acted upon by the plunger by means of a pair of alternately operable feeding fingers 33, these fingers being pivoted on a stationary rod or spindle 34 that is carried by the frame. Each finger is provided with an elongated slot 35 for the passage of a crank 36. The two cranks 36 are disposed diametrically opposite each other and are carried by a shaft 37 that is journaled in the frame and is provided at one end with a pinion 40 that intermeshes with an intermediate gear 41 mounted on a stud 42 projecting from the side of the frame.

The gear 41 receives motion from a pinion 42' that is rigidly secured to a shaft 43 journaled in bearings carried by the lower pair of beams 11, and extending completely across the machine. The opposite end of this shaft 43 carries a fixed sprocket wheel 45 that is connected by a link belt 46 to a sprocket wheel 47 on the shaft 28, and said sprocket wheel 45 is, therefore, continuously rotated so long as motion is imparted to the main belt wheel 31.

Mounted loosely on the lower transverse shaft 43 is a gear wheel 50 and the adjacent ends of the hubs of the sprocket wheel 45 and gear wheel 50 are provided with clutching teeth 51 which may be moved into engagement with each other when it is desired to transmit movement from the sprocket wheel to the gear.

The outer end of the hub of sprocket wheel 45 is provided with an annular groove 53 for the reception of the bifurcated end of a lever 54 that is journaled on a bracket 55, and provision is made for automatically operating said lever for the purpose of engaging and disengaging the clutch, the movement of the shaft being stopped during the tying of a bale and started as soon as the tying and twisting operation is completed. The feeding fingers 33 extend through slots 56 formed in a curved hood 57 that extends over the lower rear end of an inclined conveyer 58. The conveyer is preferably in the form of a frame 59 having a pair of transverse shafts 60 and 61, around which passes a feed belt 62. The lower shaft 60 projects beyond one side of the frame and is provided with a sprocket wheel 63 which is connected by a link belt 64 to a sprocket wheel 65 on the shaft 37, so that any material placed on the belt will be fed down into the path of movement of the feeding fingers and forced by the fingers downward into the path of movement of the reciprocatory plungers.

In order to assist the feeding operation, a pair of stepped and inclined feed plates 67 are employed. The front ends of these plates are arranged to work in guiding grooves 68 formed in the side bars 59 of the conveyer frame, and the rear ends of said plates slightly converge on lines approximately parallel with the opposite sides of the hood 57. These plates are arranged to reciprocate and are provided with stepped shoulders 70 which, by engagement with the material, will tend to gradually feed the same forward. The feeding strips are provided with outwardly extending lugs 72 for the reception of crank pins carried by arms 73 projecting from a pair of vertical shafts 74 that are journaled in the side bars of the conveyer frame, and each of these shafts is provided with a lower rock arm or plate 77, the two arms being connected for mutual movement by a rod 78. One of the arms 77 is connected by a pitman 79 to a crank pin 80 projecting from the face of the sprocket wheel 63, so that the rocker shafts 74 will be oscillated and will transmit reciprocatory movement to the stepped feeding plates or strips 67.

The upper belt 21 of the compression chamber is carried by two rollers 81 and 82, and the lower belt is supported by two rollers 83 and 84. The roller 84 is rigidly secured to the lower transverse shaft 43, and the gear wheel 50 of this shaft intermeshes with a gear 85 of the same diameter that is secured to a shaft 86, the latter carrying the roller 82, so that both rolls will be rotated and the two belts will be actuated by precisely the same speed and the material which is forced between them by the plungers will be carried by the belts to the discharge end of the chamber. The material is divided into bales by means of division strips or bars 88 which are permanently secured to the belts and are arranged at equi-distant intervals from each other, these strips or bars projecting inward through a distance sufficient to partly divide the material, the final severing of the material to form separate bales being accomplished during the passage of the baling wires across the baling chamber.

Mounted on the cover or top plate 90 of the baling chamber is a frame 91 in which is journaled a yoke shaped frame having two arms 92 and 93 that straddle the baling chamber. The lower end of the arm 92 is connected to a cross head 94 that is mounted in guides 95 projecting from one side of the baling chamber, and to this cross head are secured two needles 96 and 97, the needles being arranged to move across the baling chamber and carry the baling wires x.

The two needles are arranged to move in paths close to the division strips 88, and in order that the material between successive bales may be severed, a cutting knife 98 is secured to the needles near the forward ends thereof, the knife being serrated and slightly inclined, so that it may exercise more or less of a draw cut and thus pass through the material with minimum resistance.

The needles are channeled being approximately U-shape in form, the open side of the needle 96 being uppermost and the open side of the needle 97 lowermost and the side walls of each needle are cut away, as indicated at 99, to facilitate the passage of the wire clamping means by which the wires are held during and after the twisting operation. In each needle is arranged a small grooved pulley 100, around which the wire passes for the purpose of minimizing friction.

At that side of the baling chamber which supports the wire twisting mechanism, is arranged a plate 102 having a vertically elongated slot 103 through which the two needles pass to the twisting mechanism. On the outer face of this plate is mounted a longitudinally slidable plate 104, also provided with a slot 105 for the passage of the needles, the slot 105 being approximately twice the width of the slot 103. One wall of the slot 105 is shaped to form a pair of clamping jaws 106 which co-act with the adjacent wall of the slot 103 for the purpose of clamping the two wires that extend one from the upper portion of the needle 96 and the other from the lower portion of the needle 97, this clamping action occurring immediately after the needles have been thrust across the baling chamber, and continuing until after the completion of the wire twisting operation, while the width of the slot 105 is such that the needles may retreat across the baling chamber during the twisting operation, leaving the wires in the clamped position. The plate 104 is guided between a pair of straps 107 and is connected to one end of a lever 108 that is pivoted on a bracket 109 projecting from the side of the baling chamber. The opposite end of this lever carries an anti-friction roller 110 which engages a cam 111 that is mounted on a shaft 112, said shaft being arranged to make one complete rotative movement at the completion of each bale compressing operation, for the purpose of twisting the ends of the baling wires together.

Mounted at one side of the baling chamber is a frame 115 having bearings for the support of the shaft 112, and loosely mounted on one end of this shaft is a large bevel gear 116 that intermeshes with a bevel pinion 117 on the shaft 42, the bevel wheel 116 being rotated continuously during all the time the machine is in operation, but transmitting movement to the shaft 112 to the extent of one complete rotative movement after the compression of the material necessary to form each bale.

The hub of the gear 116 is provided with clutch teeth which are arranged to be engaged by a clutching sleeve 118 that is feathered to the shaft 112, and this sleeve has an annular groove receiving the bifurcated end of a lever 119 that is pivoted on the fixed frame.

At the rear end of the baling chamber is a transversely disposed shaft 120 from the central portion of which projects an arm 121 that is disposed immediately in the path of the bales as they are discharged from the chamber, and during a bale discharging movement, this arm will be held up in an approximately horizontal position. As soon as the bale passes beyond the end of the arm and falls, said arm will be swung down to a vertical position by means of a spring 122 that is connected to an arm 123 secured to one end of the shaft. This arm 123 is connected by a rod 124 to a rocker arm 125 on a vertical shaft 126 that is disposed at one side of the baling chamber adjacent the entrance end thereof, and from this shaft projects an arm 127 that is arranged to engage with and operate the clutch lever 55, it being noted that when the main bale engaging arm 121 is in the vertical position and the bale is issuing from the chamber, the clutching teeth 51 of the sprocket wheel 45 and gear 50 will be held in engagement with each other, so that movement will be transmitted to the feeding fingers, and the belts of the compression chamber, but when the bale engaging arm swings down to the vertical position, the clutch will be released and movement will no longer be transmitted to the gear wheel 50, and the belt, so that said belts will stop until after the completion of the twisting of the bale wires.

Mounted pivotally on that end of the shaft 120 opposite the spring is a U-shaped lever 130, the upper arm of this lever being connected by a rod 131 to the clutch operating lever 119. The opposite arm of the lever carries a pivoted pull pawl 132, the toothed end of which is arranged to engage the shoulder of a ratchet disk 133 that is rigidly secured to the shaft 120, the shoulder being moved to engaging position when the arm 121 is moved upward by engagement with a bale, and then when the arm is pulled down after the passage of a bale, the disk is turned, and the movement is transmitted from the shouldered disk to the pawl, and from thence to the lever 130, turning the latter and pulling on the rod 131, so that movement is imparted to the clutch operating lever 119 and the gear wheel 116 is clutched to the shaft 112.

The tail of the pawl 132 is engaged by a spring 134 that surrounds a rod 135 pivoted to the tail of the pawl and passing through a small guiding opening in a lug 136 carried by the bell crank lever. Provision is made for engaging the tail of the pawl and moving the same to release position for the purpose of allowing the clutch to move to release position after the completion of the wire twisting operation, and this release of the clutch is accomplished automatically, as will hereinafter appear.

On the auxiliary frame at the side of the press are arranged two shafts 140 and 141 that are disposed in superposed relation. At the inner end of each of these shafts is secured a small drum 143 carrying at one end a cutting knife 144, and at the opposite end a toothed clamp 145. The clamp in the present instance is in the form of a disk having five equi-distantly spaced teeth which co-act with the adjacent concaved surface 147 of a stationary clamping plate 148 for the purpose of temporarily holding the wires, this clamping device being principally intended to hold the end of the wire after the completion of the twisting operations, and the wire extending across the baling chamber in position to be formed into a loop by the material being compressed in the form of a bale.

The cutter 144 is provided with five radially extending cutting blades 149 which are arranged to coact with a stationary cutting blade 150 arranged at the bottom of a slot 151 formed in a plate 152, and the edges of the cutters are arranged slightly to the rear of the edges of the clamping teeth, so that they will not tend to grip the wire until the latter is ready to be released.

The outer ends of the shafts are connected to each other by gears 151 of equal diameter, and the gear of the upper shaft intermeshes with a pinion 152 that is carried by a short shaft or stud 153 mounted in the stationary frame. Secured to the pinion 152 is a bevel pinion 154 that is arranged to be engaged by a beveled rack 155 carried by a revoluble disk 156 that is permanently secured to the shaft 112. The length of the rack 155 and the diameter of the gear 154 are such that during the single complete rotative movement of the disk and the full travel of the rack in mesh with the gear, the cutters and clamps will be revolved to the extent of two-fifths of a revolution. The shafts will be rotated immediately after the needle crosses the baling chamber, at which time the loop of wire projecting from each needle will be caught by the clamping teeth and radial cutters, which latter are arranged to move through the recessed sides 99 of the needles.

Mounted in bearings in the stationary frame are two helically twisted or threaded shafts 160, and to the inner end of each shaft is secured a wire twister 161 having a projecting finger 162 that is arranged to engage with two of the wire ends held by the clamping devices, and twist such wire ends together. The helical shafts extend through a vertical groove 164 that is formed in the outer end of the arm 93, and as the latter moves, the two shafts will be rotated first in one direction, and then in the opposite direction. The lower end of the arm 93 is provided with a second groove 166 through which passes a crank pin 167 that projects from the revoluble disk 156, and as this disk makes one complete revolution at each operation, the two arms 92 and 93 of the yoke like frame will make one complete oscillatory movement for the purpose of moving the needles across the baling chamber, clamping, cutting and twisting the wires, and again moving the needle back to the initial position, leaving the baling wires stretched straight across the chamber in position to be engaged by the forward end of a new bale. In the operation of this portion of the mechanism, the position assumed by the parts during the bale forming operation, is such that a single wire $x$ is engaged by each of the clamps and passing from thence through the clamping jaws 106 extends around the forward end of the bale or that end of the bale nearest the discharge end of the chamber, and thence along the side of the bale to the needle. At this time a previously formed bale is being forced through the end of the discharge chamber, and by engagement with the arm 121 is holding the latter in the approximately horizontal position, so that the clutch 118 is in the idle position, and no movement is being transmitted to the shaft 112. At this time, also, the crank pin 156 is disposed in a horizontal plane with the axis of the shaft 112 and lies adjacent the side of the baling chamber, while the needles are drawn clear out beyond the opposite side of the baling chamber, leaving the latter free for the passage of the material being compressed.

When a bale drops from the discharge end of the press, the finger 121 will be swung down from the horizontal position and will operate through the ratchet mechanism and the clutch lever to move the clutching sleeve 118 into engagement with the clutch hub of the bevel gear 116, so that the shaft 112 will be started into motion.

During the first portion of the movement of the shaft and the disk 156, the arm 92 will be rocked in such manner as to carry the needles across the baling chamber and the cutting knife which is carried by said needles sever any material which may tend to connect two adjacent bales. The movement of the needles will be completed by the time the disk 156 has moved to the extent of 180°, but during the latter part of this movement, the travel of the needles will be so slow as to be practically negligible. Just at this time, or as the disk nears the completion of its 180° movement, the cam 111 will operate on the needle 108 and move the clamping plate 104 for the purpose of clamping the two wires which project one from the upper side of the needle 96 and the other from the lower side of the needle 97, and at the same time the rack 155 will have engaged a bevel pinion 154, and movement will be transmitted to the two shafts 140 and 141, so as to revolve the same to the extent of two-fifths of a revolution. As a result of this, the loops of wire which have already been caught by the clamping plate will be caught by the adjacent teeth of the revoluble clamps, and will, also, be looped around the alining cutting blade, and it will be remembered that the initial wire $x$ is already in position in this clamp. As each clamp and cutter is revolved to the extent of two-fifths of a revolution, the two wires which have been caught by the clamps will be carried to and beyond the stationary cutting blade 150 and will be severed, but the wires will still be retained in place by the clamping plate 104, while the loops of wire which have passed around and beyond the radial cutting blades 149 will be carried down to the position assumed by the initial wire first referred to and held in such position as to be engaged by the material advancing in the formation of another bale. As soon as the disk passes beyond the 180° mark, the needle starts to retreat but the clamping plate still retains said needles in place, although the wires have not yet been completely severed, the location of the rack being such that the severing operation does not occur until after the twisting operation commences. As soon as the yoke like frame starts to swing back to carry the needles to the initial position, and the arm 93 moves in a corresponding direction, the helical shafts 160 of the twisters will start to revolve and the finger 162 of said twisters will engage with the wires which are about to be severed and will start the twisting operation, and as soon as the wires have been so engaged, the cutters will act and the wires will be severed, while the twisting operation continues until the full swing of the yoke like frame has been accomplished, and the needles restored to the initial position. Just before the return of the crank pin to its initial position of rest, the cam 111 will engage the lever 108 and will move the clamping plate to release position, so that the twisted wires now bound around the bale will be free to move with the completed bale toward the point of discharge. It now remains to unclutch the shaft 112 and to again start the movement of the belts and feeding devices.

Pivoted to the side of the compression chamber at a point adjacent the discharge end thereof, is a lever 170 having at one end a projecting arm 171 that is arranged to engage the tail of the pawl 132. The opposite end of the lever is connected by a rod 172 to a bell crank lever 173 that is pivoted on the frame. One arm of the bell crank lever is disposed in the path of movement of the arm 93 of the yoke frame, and as the latter moves toward its initial position of rest it will engage with this bell crank lever and will transmit movement to the lever 170, so that the finger 171 will be forced into engagement with the pawl, thereby locking the pawl on its pivot and moving the toothed end of the pawl out of engagement with the shouldered disk 133, and then a spring 176 of the rod 131 moves the clutch operating lever in such manner as to withdraw the clutching sleeve 118 from engagement with the clutch hub of the gear 116, stopping the movement of the twisting mechanism. At the same time a spring 122 operates on the rod 124 at the opposite side of the press and actuates the clutch lever 55 for the purpose of moving the sprocket wheel 45 into clutching engagement with the gear wheel 50, so as to again start the movement of the feeding devices and the two endless belts of the compression chamber.

I claim:—

1. In a baling press, a baling chamber, movable belts forming opposing walls of the baling chamber, and division strips carried transversely of said belts for severing the compressed bales.

2. In a baling press, a baling chamber, movable belts forming opposing walls of the baling chamber, division strips carried by the belts transversely thereon for severing the compressed bales, and connecting gearing for positively driving the belts at uniform speed.

3. In a baling press, a baling chamber, a plunger mechanism for compressing the material within the chamber, a pair of feeding fingers mounted for oscillation on a fixed pivot, a hood having slots for the passage of the fingers, and an endless conveyer for delivering the material within the hood.

4. The combination with a baling press, of a baling chamber, a compression plunger, fingers for feeding the material into position to be acted upon by the plunger, an endless conveyer for delivering the material to the fingers, and a pair of feeding strips extending over each conveyer and disposed at an angle thereto, said strips being provided with a plurality of shoulders for engagement with the material.

5. In a baling press, the combination with a baling chamber, of a compression plunger, feeding fingers for delivering the material to a position in advance of the plungers, and a conveyer, a pair of angularly related feeding strips disposed above the discharge end of the conveyer, rock shafts journaled at the sides of the conveyer, cranks carried by the rock shafts and engaging said strips, crank arms on the rock shafts, a connecting bar between the crank arms, and an operating member connected to one of said crank arms.

6. The combination with a baling press including a baling chamber, of a plurality of wire carrying needles movable across the baling chamber, and a cutting knife carried by said needles for severing the material to form separate bales.

7. In a baling press, including a baling chamber, a pair of wire carrying needles movable across the chamber, and a serrated cutting blade secured between said needles and adapted to sever the material to form separate bales.

8. In a baling press, a baling chamber, a yoke like frame straddling said chamber, a needle carrid by one arm of the frame, and a wire twisting mechanism operable from the opposite arm of said frame.

9. The combination with a baling press including a baling chamber, of a wire carrying needle arranged to move across the baling chamber, a pair of spaced rotating wire clamps arranged to engage the wire, a twister arranged to engage the wires at a point between the clamps, and means for cutting the wire at a point beyond the outermost clamp.

10. The combination with a baling press having means for supporting a reel of wire, of a wire carrying needle, a revoluble member having a plurality of successively operable clamping surfaces, means for operating said clamping member, an inner clamp for engaging the wires at a point between the first mentioned clamp and the reel support, a twister arranged to engage the wires at a point between the clamps, and a cutting means movable with and arranged beyond the clamping member.

11. The combination with a baling press having means for supporting a reel of wire, of a wire carrying needle, a revoluble toothed clamp arranged to engage the loop of wire carried by the needle, an inner clamp for engaging the wire between the toothed clamp and reel support, a revoluble twister arranged to engage and twist the wire between the two clamps, and means operating with said toothed clamp to guide the wire during the twisting operation.

12. In combination, a baling press including a baling chamber, a wire carrying needle, a pair of spaced rotating wire clamps arranged to revolve and engage the wires, a twister engaging the wire between the two clamps, a helical shaft carrying the twister, and a pivotally mounted frame having a slotted arm for engaging the helical shaft and provided with a second arm connected to the needle.

13. The combination with a baling press including a baling chamber, of a wire carrying needle, a pivotally mounted frame having one arm connected to the needle, the opposite arm of said frame having an elongated slot, a twister having a helical shaft that passes through said slot, and means for actuating said frame.

14. The combination with a baling press including a baling chamber, of a wire carrying needle arranged to move across the baling chamber, a shaft, a toothed wire clamping disk, and a cutter mounted on the shaft, the cutter having blades of a number corresponding to the number of clamping teeth, said teeth and cutters being arranged substantially in alinement and arranged to receive the loop of wire carried by the needle, an inner clamp for holding the wire, and a twister for engaging the wires at points between the two clamps.

15. The combination with a baling press, of a wire carrying needle, a twister, a helical shaft carrying the twister, a slotted arm engaging said shaft, a crank disk for actuating said arm, a rack on said crank disk, a revoluble clamp, a shaft carrying the same, and a gear carried by the shaft and engaging said rack.

16. The combination with a baling press, of a wire carrying needle, a twister, a helical shaft carrying the twister, a slotted arm engaging the helical shaft, a crank disk for actuating said slotted arm, a rack carried by the disk, a shaft arranged parallel with the twister shaft and provided with a gear in mesh with the rack, a toothed clamping disk, and a cutter carried by said shaft and arranged to receive the loop of wire carried by the needle, and an auxiliary clamp arranged to engage the wires at a point between the twister and the baling chamber.

17. The combination with a baling press, of a wire carrying needle, a slotted plate arranged at one side of the baling chamber of the press to permit the passage of the needle, a clamping plate movable to clamp the wire against one wall of the slot, a shaft, a cam carried thereby, a lever connected to the plate and arranged to be actuated by said cam, a crank disk carried by the shaft and provided with a rack, a crank pin projecting from the disk, a yoke frame pivoted upon the baling chamber and having one arm connected to the needle, the second arm of the yoke being provided with a pair of slots, one of which is engaged by the crank pin and twister, a helical twister shaft extending through the second slot of the arm, a revoluble cutter, and a toothed clamping disk, a shaft carrying the cutter and disk, and a gear carried by the cutter shaft and intermeshing with said rack.

18. The combination with a baling press, of a wire carrying needle, a twister, a compression means for forcing the material into the baling chamber, an operating device for the compression means, and means under the control of bales issuing from the chamber for connecting and disconnecting the needle and twister from said operating means.

19. The combination with a baling press, including a baling chamber, of a wire carrying needle, a wire twisting mechanism, an operating device normally disconnected from said twisting mechanism, a shaft arranged at the discharge end of the baling chamber, an arm carried by the shaft and arranged to engage the bales of material as they issue from the chamber, a shouldered disk rigidly secured to the shaft, a lever pivoted on the shaft, means under the control of said lever for connecting and disconnecting the operating mechanism and the twisting means, a pawl carried by the lever and arranged to be engaged by the shouldered disk, and means for automatically disengaging the pawl at the completion of each twisting operation.

20. The combination with a baling press including a baling chamber, of a shaft arranged at the discharge end of the baling chamber, a rocker arm carried by the shaft and arranged to be engaged by the bales as they issue from said chamber, means for turning the arm down at the final discharge of each bale, a shouldered disk rigidly secured to the shaft, a lever pivoted on the shaft, a pawl carried by the lever and engaging said disk, a wire twisting mechanism, and operating means therefor, a clutch for connecting the wire twisting mechanism to the operating means, a clutch operating lever operable at the completion of each twisting operation for disengaging the pawl from the shouldered disk and permitting movement of the clutch to release position.

21. The combination with a baling press including a baling chamber, of a wire twisting mechanism operable at the completion of each bale, a pair of belts forming opposing walls of the baling chamber, a compression means for forcing the material into the baling chamber, an operating device for imparting motion to the compression means, and the belts, and means under the control of bales issuing from the chamber for stopping movement of the belts during the wire twisting operation and permitting continued movement of the compression means during such operation.

22. In a baling press, a baling chamber, a pair of movable belts forming opposing walls of the baling chamber, an intermittently operable wire twisting mechanism, means for stopping the movement of the belts during the operation of the wire twisting mechanism, and a continuously operable compression mechanism arranged to force the material into the baling chamber.

In testimony that I claim the foregoing as my own, I have hereto affixed my signature in the presence of two witnesses.

JOHN W. GALBREATH.

Witnesses:
 JNO. E. PARKER,
 FRANK S. APPLEMAN.